US012663082B2

(12) United States Patent
Hu et al.

(10) Patent No.: US 12,663,082 B2
(45) Date of Patent: Jun. 23, 2026

(54) SEALING DEVICE, APPARATUS AND ROBOT HAVING THE SAME

(71) Applicants: SHANGHAI FLEXIV ROBOTICS TECHNOLOGY CO., LTD., Shanghai (CN); FLEXIV LTD., Grand Caymen (KY)

(72) Inventors: Shaobo Hu, Shanghai (CN); Xuesen Li, Santa Clara, CA (US); Hao Jiang, Santa Clara, CA (US); Zhiyang Liang, Foshan (CN)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 0 days.

(21) Appl. No.: 18/437,883

(22) Filed: Feb. 9, 2024

(65) Prior Publication Data

US 2024/0209944 A1 Jun. 27, 2024

Related U.S. Application Data

(63) Continuation of application No. PCT/CN2022/140554, filed on Dec. 21, 2022.

(51) Int. Cl.
*F16J 15/3236* (2016.01)

(52) U.S. Cl.
CPC ................................. *F16J 15/3236* (2013.01)

(58) Field of Classification Search
CPC .... F16L 17/06; F16L 5/027; F16L 5/02; F16J 15/002; F16J 15/3236
See application file for complete search history.

(56) References Cited

U.S. PATENT DOCUMENTS 4,915,892 A * 4/1990 Peppiatt .................. B29C 45/14
264/250
5,165,704 A * 11/1992 Schaeper ................ F16L 17/06
277/638

(Continued)

FOREIGN PATENT DOCUMENTS

CN 109789566 A 5/2019
CN 110944810 A 3/2020

(Continued)

OTHER PUBLICATIONS

International Search Report and Written Opinion issued Aug. 18, 2023 for International Application No. PCT/CN2022/140554 (8 pages).

(Continued)

*Primary Examiner* — Eugene G Byrd
(74) *Attorney, Agent, or Firm* — GREENBLUM & BERNSTEIN, P.L.C.

(57) ABSTRACT

Disclosed are a sealing device, an apparatus and a robot having the same. The sealing device for use between first and second members includes a first sealing component configured to be sealingly connected to the first member; and a second sealing component configured to be sealingly connected to the second member. The first and second sealing components are configured to form at least one dynamic seal with each other in a circumferential direction of the first and second members. The apparatus includes the sealing device. The robot includes a robot arm including at least a first link and the sealing device, wherein the first member is the first link and the second member is a second link, a base or an end-effector connected to the first link.

18 Claims, 3 Drawing Sheets

(56) References Cited

U.S. PATENT DOCUMENTS

| | | | | |
|---|---|---|---|---|
| 6,209,879 | B1 * | 4/2001 | Mizunoya | F16J 15/3232 277/423 |
| 10,125,903 | B1 * | 11/2018 | Doran | F16J 15/025 |
| 10,145,473 | B2 * | 12/2018 | Angiulli | F16J 15/002 |
| 2007/0013146 | A1 * | 1/2007 | Gariepy | F16L 17/06 277/608 |
| 2009/0166983 | A1 * | 7/2009 | Ebihara | F16J 15/3232 277/553 |
| 2010/0237565 | A1 | 9/2010 | Foster | |
| 2012/0161399 | A1 | 6/2012 | Kupper | |
| 2013/0043661 | A1 | 2/2013 | Binder et al. | |
| 2015/0001810 | A1 | 1/2015 | Broadbent | |
| 2015/0021908 | A1 * | 1/2015 | Cronin | F16J 15/3236 285/302 |
| 2015/0152754 | A1 * | 6/2015 | Heldmann | F16J 15/166 277/502 |
| 2015/0298750 | A1 | 10/2015 | Hirota et al. | |
| 2016/0018002 | A1 * | 1/2016 | Lenhert | F16J 15/3236 277/540 |
| 2016/0265665 | A1 * | 9/2016 | Desjardins | F16J 15/3252 |
| 2017/0159827 | A1 * | 6/2017 | Csoma | F16J 15/48 |
| 2017/0361471 | A1 | 12/2017 | Groll | |
| 2018/0087666 | A1 * | 3/2018 | Noteboom | F16J 15/3288 |
| 2018/0245558 | A1 * | 8/2018 | Eck | F16J 15/002 |
| 2019/0186633 | A1 * | 6/2019 | Ma | F16J 15/3268 |
| 2019/0291704 | A1 * | 9/2019 | Anderson | B60T 13/142 |
| 2020/0056608 | A1 * | 2/2020 | Li | F04B 53/143 |
| 2020/0080643 | A1 * | 3/2020 | Wehmann | F16J 15/344 |
| 2020/0101628 | A1 | 4/2020 | Li et al. | |
| 2021/0273243 | A1 * | 9/2021 | Lee | H01M 8/02 |
| 2022/0056997 | A1 * | 2/2022 | Armitage | F16J 15/18 |
| 2023/0160508 | A1 * | 5/2023 | Lippka | F16L 17/04 285/337 |
| 2024/0175494 | A1 * | 5/2024 | Liang | F16J 15/3464 |

FOREIGN PATENT DOCUMENTS

| | | | | | |
|---|---|---|---|---|---|
| CN | 112728048 | A | | 4/2021 | |
| CN | 114851243 | A | * | 8/2022 | |
| JP | H02205493 | A | | 8/1990 | |
| JP | 2009-107116 | A5 | | 7/2009 | |
| JP | 4648514 | B2 | * | 3/2011 | F16J 15/3228 |
| JP | 2018179241 | A | * | 11/2018 | F15B 15/1452 |
| WO | 2011108298 | A1 | | 9/2011 | |
| WO | WO-2018102965 | A1 | * | 6/2018 | B25J 19/0079 |
| WO | WO 2022/226979 | A1 | | 3/2022 | |

OTHER PUBLICATIONS

Office Action issued in the corresponding Chinese Patent Appl. No. CN202211651040.3, along with English translation thereof.

European Search Report dated Sep. 30, 2025 in corresponding EP Patent Application 22968873.4.

Notice of Allowance issued in the counterpart Chinese Patent Application No. 202211651040.3 dated Mar. 20, 2026.

* cited by examiner

1000

1

300

2

3

4

5

6

1

2

SEALING DEVICE, APPARATUS AND ROBOT HAVING THE SAME

CROSS-REFERENCE TO RELATED APPLICATIONS

This application is a Continuation of International Patent Application No. PCT/CN2022/140554 filed Dec. 21, 2022, the content of which is hereby incorporated by reference in its entirety.

TECHNICAL FIELD

The present disclosure relates to the technical field of mechanical sealing, and more particularly to sealing between links of mechanical apparatuses such as robots.

BACKGROUND

Industrial robots have been widely used in various industries, such as welding, assembling, grinding, polishing, spraying, medical surgery, agricultural operations, entertainments or education, and the like. In practical applications, the robot may not only be applied to an indoor environment, but also to an outdoor environment. In scenes where the working environment is harsh, the requirements for the protection and the sealing performance for/of the robot are high, otherwise dust, metal particles or water can enter the robot body, which can cause corrosion and damage to the robot joints, thereby affecting the function of the robot. In addition, in some special scenes with high cleanliness requirements, such as medical treatment, food production, and manufacturing of precision electronic devices, it is required that the robot itself cannot generate pollution, otherwise the produced products will be polluted. Therefore, it is necessary to seal between the links of the robot arm of the robot, to prevent water, dust, and the like from entering the robot body, so as to prevent damage to the robot, or to prevent contamination inside the robot from leaking into the external environment so as to satisfy the cleanliness requirements of the application scenes.

SUMMARY

According to a first aspect of the present disclosure, there is provided a sealing device configured for use between a first member and a second member, the sealing device includes: a first sealing component configured to be sealingly connected to the first member; and a second sealing component configured to be sealingly connected to the second member, wherein the first sealing component and the second sealing component are configured to form at least one dynamic seal with each other in a circumferential direction of the first member and the second member. The first member and the second member may be made of metal. A portion of the first sealing component and a portion of the second sealing component that are in contact with each other may be made of plastic.

In at least one embodiment according to the present disclosure, the first sealing component may be fixedly and sealingly connected to the first member, and/or the second sealing component may be fixedly and sealingly connected to the second member.

In at least one embodiment according to the present disclosure, the first sealing component may have a first sealing portion and a second sealing portion. The first sealing portion may be disposed between the first member and the second sealing portion and may be configured to seal the first member and the second sealing portion in a radial direction of the first member and the second member. The second sealing portion may be made of plastic.

In at least one embodiment according to the present disclosure, the rigidity of the material of the second sealing portion may be greater than the rigidity of the material of the first sealing portion.

In at least one embodiment according to the present disclosure, the second sealing component may include a third sealing portion and a fourth sealing portion. The third sealing portion may be disposed between the second member and the fourth sealing portion and may be configured to seal the second member and the fourth sealing portion in the radial direction and an axial direction of the first member and the second member. The fourth sealing portion may be made of plastic and may be configured to form the at least one dynamic seal with the second sealing portion in the circumferential direction of the first member and the second member.

In at least one embodiment according to the present disclosure, the rigidity of the fourth sealing portion may be greater than that of the third sealing portion.

In at least one embodiment according to the present disclosure, one of the second sealing portion and the fourth sealing portion may define a concave portion and the other of the second sealing portion and the fourth sealing portion may be provided with a convex portion. The convex portion may be inserted into the concave portion and be in contact with the concave portion to form the at least one dynamic seal in the circumferential direction of the first member and the second member.

In at least one embodiment according to the present disclosure, contact between the concave portion and the convex portion may be substantially linear contact.

In at least one embodiment according to the present disclosure, the side surface of the concave portion or a portion of the side surface may be a flat surface, and the convex portion may have a smooth rounded surface in contact with the flat surface. Alternatively, the side surface of the concave portion or a portion of the side surface may be a smooth rounded surface, and the convex portion may have a flat surface in contact with the smooth rounded surface. Alternatively, the side surface of the concave portion or a portion of the side surface may be a smooth rounded surface, and the convex portion may have a smooth rounded surface in contact with the smooth rounded surface.

In at least one embodiment according to the present disclosure, the first sealing portion may include an O-ring, an annular sealing gasket, or a U-ring mounted between the second sealing portion and the first member, the second sealing portion may include a junk ring. The first sealing portion may be made of rubber.

In at least one embodiment according to the present disclosure, the second sealing portion and/or the first member may define an annular groove, and the first sealing portion may be disposed in the annular groove to seal the first member. The first member may be provided with a first shoulder, and the second sealing portion may be mounted against the first shoulder.

In at least one embodiment according to the present disclosure, the third sealing portion may include a U-ring mounted between the fourth sealing portion and the second member, and the fourth sealing portion may include a junk ring. The third sealing portion may be made of rubber.

In at least one embodiment according to the present disclosure, the fourth sealing portion and/or the second member may define an annular groove, the third sealing portion may be disposed in the annular groove to seal the second member, the second member may be provided with a second shoulder, and the third sealing portion may be mounted against the second shoulder.

In at least one embodiment according to the present disclosure, the first sealing portion may include an O-ring and may be disposed between the first member and the second sealing portion. The third sealing portion may include a U-ring, and the fourth sealing portion may be disposed between the third sealing portion and the second sealing portion.

In at least one embodiment according to the present disclosure, the plastic may include at least one of PVCTE, polyvinyl chloride, polypropylene, polyethylene, polybutene, acrylonitrile-butadiene-styrene copolymer, or polytetrafluoroethylene.

According to a second aspect of the present disclosure, there is provided an apparatus including a first member and a second member that are made of metal and a sealing device as previously described disposed between the first member and the second member.

According to a third aspect of the present disclosure, there is provided a robot including a robot arm, wherein the robot arm includes at least a first member and a second member that are made of metal and a sealing device as previously described disposed between the first member and the second member, wherein the first member may be a first robot arm link, and the second member may be a second robot arm link, a base, or an end-effector, wherein the second member may be rotatably connected to the first member.

In at least one embodiment according to the present disclosure, the first sealing component may include a first sealing portion and second sealing portion, wherein the first sealing portion may be disposed between the first member and the second sealing portion and may be configured to seal the first member and the second sealing portion in a radial direction of the first member and the second member. The second sealing portion may be made of plastic and may be fixedly connected to the first member.

In at least one embodiment according to the present disclosure, the second sealing component may have a third sealing portion and a fourth sealing portion, wherein the third sealing portion may be disposed between the second member and the fourth sealing portion and may be configured to seal the second member and the fourth sealing portion in the radial direction and an axial direction of the first member and the second member, wherein the fourth sealing portion may be made of plastic and may be configured to form the at least one dynamic seal with the second sealing portion in a circumferential direction of the first member and the second member.

In at least one embodiment according to the present disclosure, the fourth sealing portion may be fixedly connected to the second member.

BRIEF DESCRIPTION OF THE DRAWINGS

In order to illustrate the technical solutions in the embodiments according to the present disclosure or those in the conventional art more clearly, reference will now be made to the accompanying drawings required in the description of the embodiments or the conventional art. It will be apparent that the accompanying drawings in the following description are merely embodiments of the present disclosure, and other drawings may be obtained by those ordinary skilled in the art from the disclosed drawings without paying any creative effort.

DETAILED DESCRIPTION OF THE EMBODIMENTS

The technical solutions of the embodiments according to the present disclosure will be clearly and completely described with reference to the accompanying drawings. Obviously, the described embodiments are only a part of the embodiments according to the present disclosure instead of all of the embodiments. Based on the embodiments in the present disclosure, all other embodiments obtained by those ordinary skilled in the art without involving any creative effort are within the scope of the present disclosure. Furthermore, the drawings are not necessarily drawn in scale for clarity, and unnecessary details may be omitted in order to prevent obscuring the subject matters for which protection is sought.

With reference to FIGS. 1 to 5, a sealing device 300 applied between, for example, two links of a robot arm 100 of a robot 1000 according to the present disclosure will be described in details hereinafter. Although the implementations of the sealing devices according to the present disclosure will be described hereinafter by the way of examples of two links of the robot arm 100 of the robot 1000, it will be appreciated by those skilled in the art that the sealing devices according to the present disclosure may be applied between any two members that need to be sealingly connected to each other, particularly between a first member and a second member that are rotatably connected to each other. The sealing devices according to the present disclosure are not limited to being applied between adjacent two links of the robot arm 100, or to the robot arm of the robot, but may be applied in any apparatus having similar sealing requirements.

Figure 1:
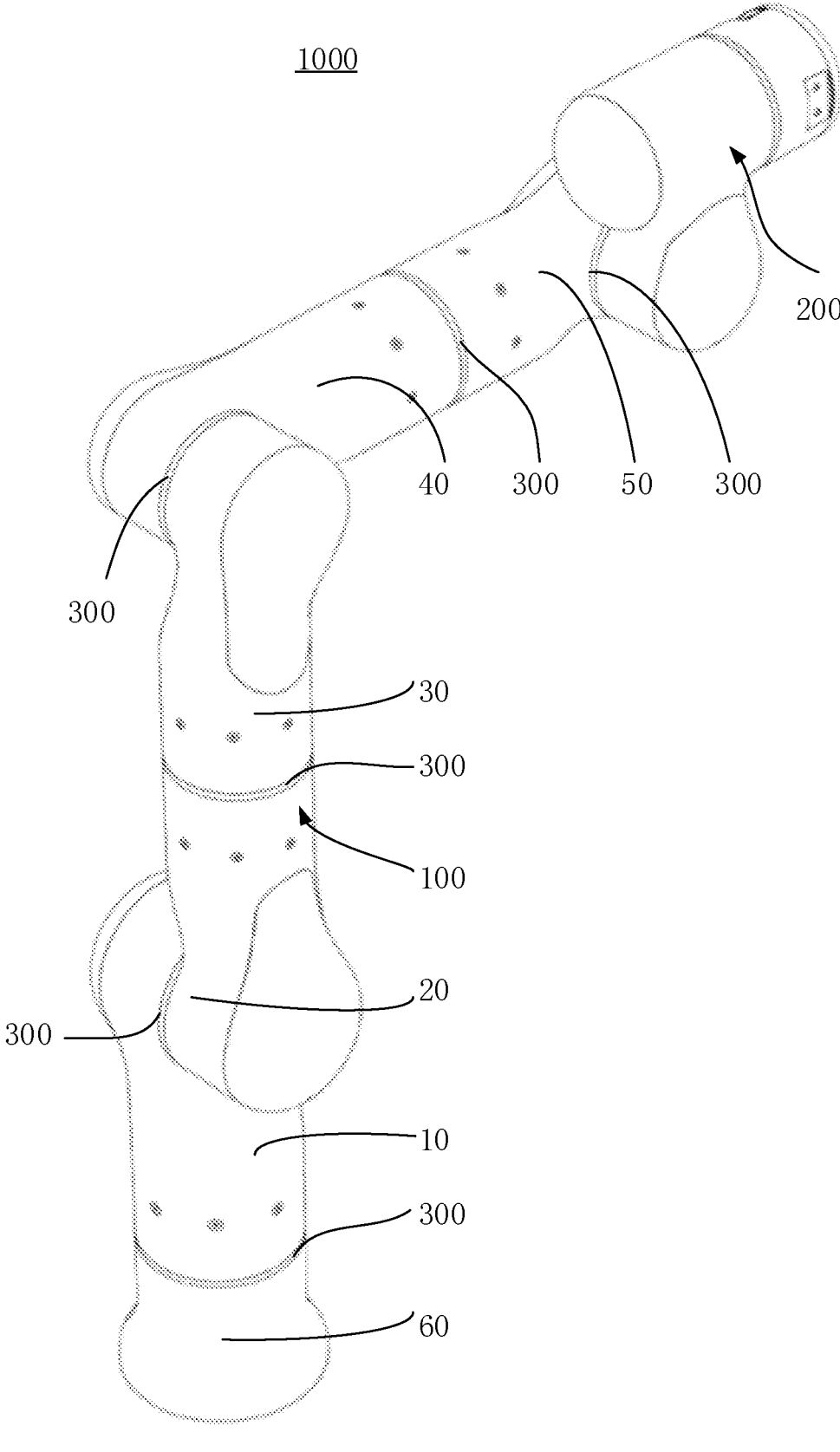
FIG. 1 is a perspective view illustrating a robot having a robot arm according to an embodiment of the present disclosure.

As shown in FIG. 1, the robot 1000 includes a robot arm 100 and an end-effector 200 mounted at the end of the robot arm 100. The robot arm 100 includes a base 60 and multiple links connected to each other by joints. In particular, in the present embodiment, the multiple links include a first link 10, a second link 20, a third link 30, a fourth link 40, and a fifth link 50. The robot arm 100 rotates each link about a respective rotational axis under the action of a driving device such as a motor and a reducer, to control the end-effector 200 mounted at the end of the robot arm 100 to a desired position and to perform a corresponding operation.

The motor and the reducer may be formed as a joint (not shown) that may be mounted between adjacent links such that the rotation of the links may be adjusted by controlling the rotational speeds of the motor and the reducer. A plurality of joints may be provided in the robot arm 100 according to the number of links. For example, the robot arm 100 of the robot shown in FIG. 1 may include six joints. More particularly, a first joint is disposed between the base 60 and the first link 10, a second joint is disposed between the first link 10 and the second link 20, a third joint is disposed between the second link 20 and the third link 30, a fourth joint is disposed between the third link 30 and the fourth link 40, a fifth joint is disposed between the fourth link 40 and the fifth link 50, and a sixth joint is disposed between the fifth link 50 and the end-effector 200. By controlling the rotation of the motor and the reducer in each joint, the position of the robot arm 100 and the position of the end-effector 200 can be changed as needed, to achieve the desired operation of the end-effector 200.

In order to prevent contaminants in the working environment from entering the robot body and/or to prevent contaminants inside the robot from leaking into the external environment, it is necessary to provide suitable sealing devices between the respective links, between the link and the base, and between the link and the end-effector.

With reference to FIGS. 2 to 5, a sealing device 300 according to the embodiment of the present disclosure will be described in details below, which may be applied between the respective links of the robot arm 100, between the link and the base 60, and between the link and the end-effector 200. In the following description, for ease of understanding, a description will be given by way of example of the sealing device 300 disposed between two adjacent links, one of the links is taken as the first member 1, and the other one is taken as the second member 2. Further, in order to highlight the specific structure of the sealing device 300 disposed between the two links, the structures of the links are simplified and only schematically depicted.

Figure 2:
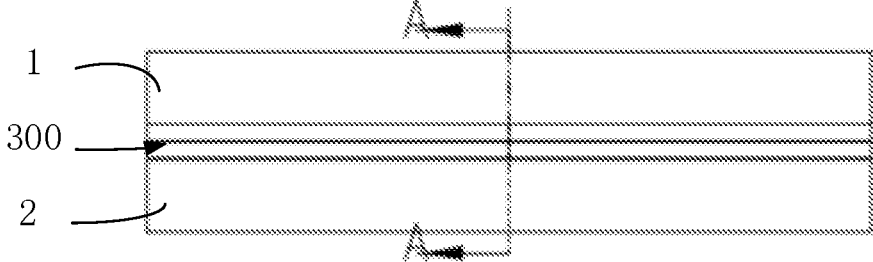
FIG. 2 is a front view illustrating a sealing device of an embodiment according to the present disclosure.
Figure 3:
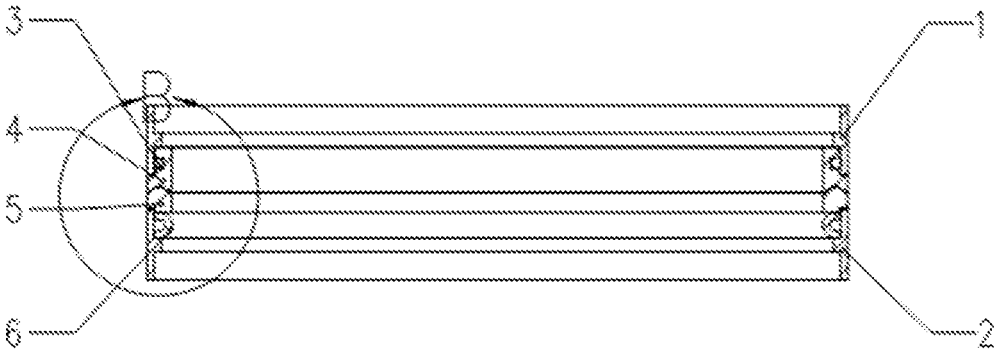
FIG. 3 is a cross-sectional view illustrating the sealing device taken along line A-A in FIG. 2.
Figure 4:
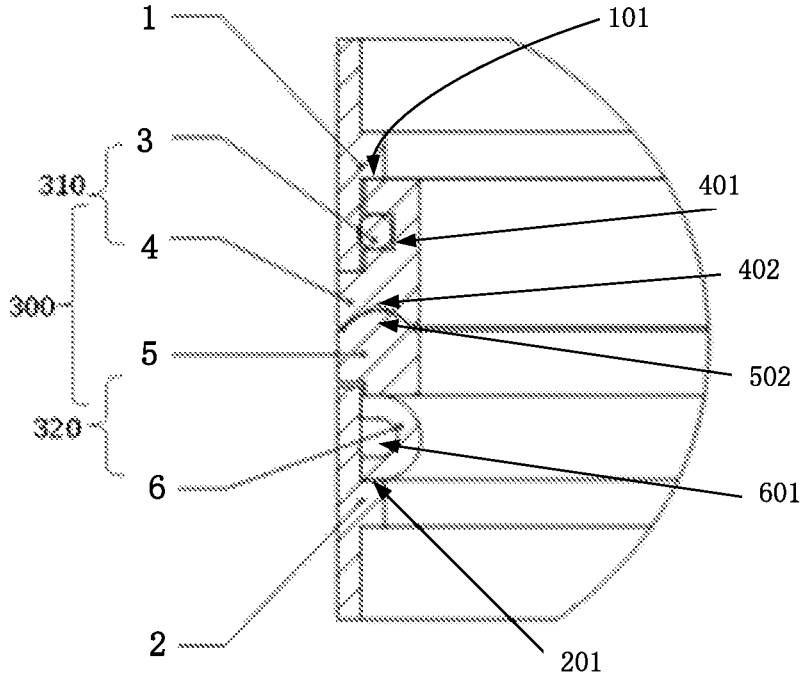
FIG. 4 is a partially enlarged sectional view of part B of the sealing device shown in FIG. 3.

As shown in FIGS. 2 to 4, the sealing device 300 includes a first sealing component 310 and a second sealing component 320 disposed between the first member 1 and the second member 2. The first sealing component 310 is connected to first member 1, the second sealing component 320 is connected to the second member 2, and at least one rotary dynamic seal is formed between the first sealing component 310 and the second sealing component 320. In one embodiment according to the present disclosure, the first sealing component 310 is sealingly and fixedly connected to the first member 1 by friction, and the second sealing component 320 is also sealingly and fixedly connected to the second member 2 by friction.

In particular, the first sealing component 310 includes a first sealing portion 3 and a second sealing portion 4, and the second sealing component 320 includes a third sealing portion 6 and a fourth sealing portion 5. As shown in FIG. 4, the first sealing portion 3 is an O-ring, the second sealing portion 4 is a junk ring having an annular groove 401 formed on the outside thereof, and the first sealing portion 3 is mounted in the annular groove 401 and between the inside wall of first member 1 and the second sealing portion 4. Further, the inside of the first member 1 is provided with a first shoulder 101, and one end of the second sealing portion 4 adjacent to the sealing groove 401 is mounted against the first shoulder 101. When the first sealing component 310 is mounted to the first member 1, at least the first sealing portion 3 generates a certain deformation so that a sealed and fixed connection between the first sealing component 310 and the first member 1 can be achieved by friction. Thus, when the first member 1 is rotated, the first sealing component 310 can be rotated with the first member. Although in the embodiment as described above, the first sealing portion 3 and the second sealing portion 4 are formed separately, both of them may be formed as an integrated structure. In one embodiment, the first sealing portion 3 and the second sealing portion 4 may also be formed of different materials.

Figure 5:
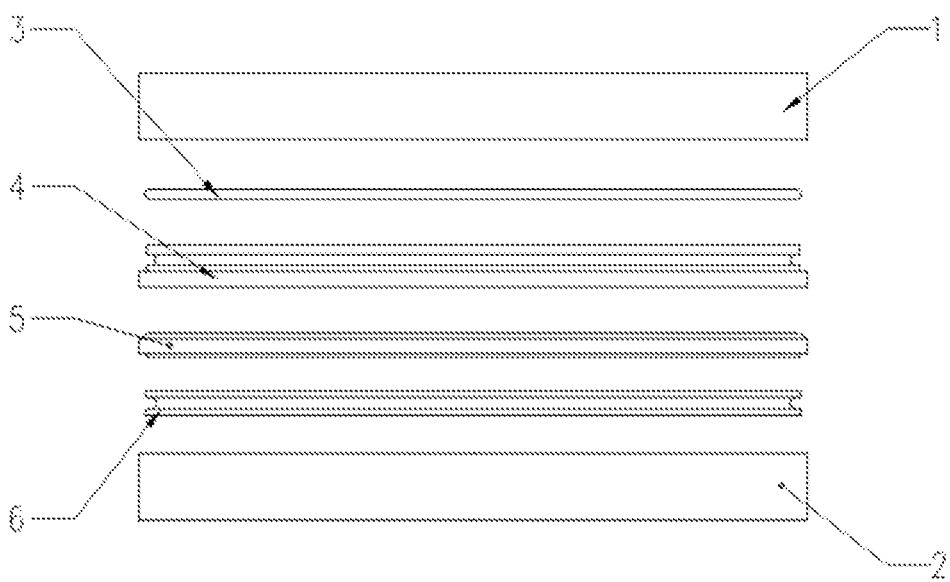
FIG. 5 is an exploded schematic view of the sealing device shown in FIG. 2.

For example, the first sealing portion 3 is made of rubber, and the second sealing portion 4 is made of PVCTE. PVCTE is an elastomer combined by polyvinylchloride and rubber. However, the first sealing portion 3 and the second sealing portion 4 may also be made of the same material. For example, both the first sealing portion 3 and the second sealing portion 4 are made of PVCTE. In some embodiments, the rigidity of the material of the second sealing portion 4 is greater than that of the first sealing portion 3, and the sealing effect is satisfying. As shown in FIGS. 3 to 5, the third sealing portion 6 may be formed as a U-ring. As shown in FIGS. 4 and 5, the third sealing portion 6 is a U-ring having a U-shaped cross-section with an opening 601 facing the inside wall of the second member 2, and the fourth sealing portion 5 is a junk ring. A second shoulder 201 is provided inside the second member 2, and the third sealing portion 6 is mounted against the second shoulder 201. The fourth sealing portion 5 is located between the second sealing portion 3 and the third sealing portion 6, with which at least the third sealing portion 6 may deform when the fourth sealing portion 5 applies a pressure to the third sealing portion 6, so that a fixed and sealed connection can be formed between the third sealing portion 6 and the second member 2. Thus, when the second member 2 is rotated with respect to the first member 1, the second sealing component 320 can rotate together with the second member 2 by the friction force.

In one embodiment, the third sealing portion 6 and the fourth sealing portion 5 may also be made of different materials. For example, the third sealing portion 6 is made of rubber, and the fourth sealing portion 5 is made of PVCTE. However, the third sealing portion 6 and the fourth sealing portion 5 may also be made of the same material. For example, both the third sealing portion 6 and the fourth sealing portion 5 are made of PVCTE. In some embodiments, the rigidity of the material of the fourth sealing portion 5 is greater than that of the third sealing portion 6, and the sealing effect is satisfying.

In addition, a rotary dynamic seal, such as a linear seal, a face seal, and/or a combination thereof, is formed between the first sealing component 310 and the second sealing component 320.

In some embodiments, as shown in FIG. 4, the lower end of the first sealing component 310 (e.g., the lower end of second sealing portion 4) defines a concave portion 402, and the cross-section of the concave portion 402 may be formed as one of a rectangular shape, a trapezoidal shape, a V-shape, a U-shape, a W-shape, or a semicircular shape. Correspondingly, a convex portion 502 is provided at the upper end of the second sealing component 320 (for example, at the upper end of the fourth sealing portion 5), and the cross-section of the convex portion 502 is formed as one of a rectangular shape, a trapezoid, a V-shape, a U-shape, a W-shape, or a semicircular shape. When the convex portion 502 is inserted into the concave portion 402, at least one rotary dynamic seal may be formed between the first sealing component 310 and the second sealing component 320. For example, as shown in FIG. 4, the cross-section of the concave portion 402 is formed as a V-shape and the cross-section of the convex portion 502 is formed as a semicircular shape, with which both side surfaces of the concave portion 402 can be sealed by the convex portion 502, thereby forming two linear seals. Depending on the shapes of the convex portion 502 and the concave portion 402 and the type of the contact therebetween (linear contact or face contact), various forms of sealing device, such as a face seal, a linear seal, or a combination thereof, may be formed between the first sealing component 310 and the second sealing component 320. Here, the linear contact includes not only ideal linear contact but also such contact where the contact surface is narrow and approximately a line (i.e., the width of the contact surface is negligible). To this end, the linear contact referred herein-after may also be referred to as approximately linear contact or substantially linear contact.

When the concave portion and the convex portion correspond to each other in incompletely matched shapes, it is easy to form a linear seal between the concave portion and the convex portion. The linear seal makes the contact area between the first sealing component 310 and the second sealing component 320 small, the friction force is small, and the wear is small, which facilitates prolonging the service life of the sealing components 310 and 320, and is convenient to disassemble so as to facilitate replacement of the sealing device. A facet seal or a combination of a linear seal and a face seal is also possible in comparison with the linear seal. Whether a linear seal, a facet seal, or a combination thereof, it is permissible as long as that the friction is suitable to form a dynamic seal between the first sealing component 310 and the second sealing component 320.

Furthermore, the shapes of the concave portion 402 and the convex portion 502 are not limited to the shapes listed above. In general, the side surface of the concave portion 402 or a portion of the side surface may be a flat surface and the convex portion 502 may have a smooth rounded surface in contact with the flat surface, or the side surface of the concave portion 402 or a portion of the side surface may be a flat surface and the convex portion 502 may have a flat surface in contact with the flat surface, or the side surface of the concave portion 402 or a portion of the side surface may be a smooth rounded surface and the convex portion 502 may have a flat surface in contact with the smooth rounded surface, or the side surface of the concave portion 402 or a portion of the side surface may be a smooth rounded surface and the convex portion 502 may have a smooth rounded surface in contact with the smooth rounded surface, with which various forms of seals may be formed between the first sealing component 310 and the second sealing component 320 depending on the sealing requirements.

In some of the above embodiments, both the second sealing portion 3 and the fourth sealing portion 5 are made of plastic such as PVCTE; however, the present disclosure is not limited thereto. In other embodiments, it is also possible that only the portion of the first sealing component and the portion of the second sealing component which are in contact with each other are made of plastic. Furthermore, in addition to the previously mentioned PVCTE, other proper materials, such as polyvinyl chloride (PVC), polypropylene (PP), polyethylene (PE), polybutene (PB), acrylonitrile butadiene styrene copolymer (ABS), and polytetrafluoroethylene (PTFE) or similar plastics, are also suitable for forming at least the part of the convex portion 502 and the part of the concave portion 402 which are in contact with each other, forming the whole convex portion 502 and the whole concave portion 402 or forming the whole second sealing portion 3 and the whole fourth sealing portion 5, or may form a coating of the convex portion 502 and a coating of the concave portion 402 in contact with each other.

It is noted that the present disclosure is not limited thereto, and the concave portion may be formed at the upper end of second sealing component 320 (e.g., at the upper end of the fourth sealing portion 5) and the convex portion may be formed at the lower end of first sealing component 310 (e.g., at the lower end of the second sealing portion 4). In addition, the first sealing component 310 and the second sealing component 320, except for the concave portion and the convex portion matching with each other, may employ the same sealing structure. For example, the first sealing component 310 and the second sealing component 320 may each take the form of a combination of an O-ring and a junk ring, or both take the form of a combination of a U-ring and a junk ring, or both take the form of an annular sealing gasket or a junk ring. A pair of junk rings (i.e., the second sealing portion 4 and the fourth sealing portion 5) oppose to each other and are embedded with each other to form a seal by the concave portion and the convex portion as previously described.

In the above description, the convex portion 502 is provided at the upper end of the second sealing component 320, and the concave portion 402 is provided at the lower end of the first sealing component 310, and the convex portion 502 and the concave portion 402 are opposite to each other. However, the convex portion may protrude radially outwardly or radially inwardly with respect to the first member and the second member, and the concave portion is formed correspondingly, if necessary.

In other embodiments, the first sealing component 310 does not seal the inside wall of the first member 1 but seal the outside wall or an end surface of the first member 1. That is, the first sealing portion 3 may be configured to seal at least one of the inside, the outside, or the end surface of the first member 1 as needed. Similarly, the second sealing component 320 may seal not only the inside wall of second member 2, but also the outside wall or the end surface of second member. That is, the third sealing portion 6 may be configured to seal at least one of the inside, the outside, or the end surface of the second member 2. From the foregoing description, those skilled in the art will know how to realize the sealing of the outside wall or the end surface of the first member 1 or those of the second member 2 with the combination of the junk ring and the O-ring, the annular sealing gasket or the U-ring, and details are omitted herein.

In addition, although the third sealing portion 6 is described by way of example of a U-ring having a U-shaped cross-section, the present disclosure is not limited thereto. First, as previously described, an annular sealing gasket or an O-ring (i.e., a sealing ring having a circular cross-section) may also be used in place of the U-ring as the third sealing portion 6. Also, the shape of the opening 601 of the U-ring is not limited to a U-shape, and may be a rectangular shape, a V-shape, a T-shape, a W-shape, a semicircular shape, or the like, so that one or more annular grooves may be formed on the inner circumference, the outer circumference, or one side end surface or even both sides end surfaces of the sealing ring. Due to the presence of the annular groove, i.e., the opening 601, the third sealing portion 6 is easily to deform under the compression of the junk ring, thereby easily forming a tight seal with the second member 2 under a small pressure.

According to the sealing device of the present disclosure described above, a sealed connection is formed between the first sealing component and the first member, between second sealing component and the second member, and between the first sealing component and the second sealing component, which properly isolates the inside and the outside of the robot arm 100. In addition, with the abovementioned sealing device, it is possible to convert the friction between the links into the friction between the sealing components, and it is also possible to realize a linear friction between the sealing components, so that the friction resistance of the movement can be greatly reduced while the sealing is ensured.

For an apparatus with a robot arm, the first member 1 and the second member 2 are typically made of metallic materials. With the sealing device according to the present disclosure, a pair of junk rings may be made of PVCTE, which avoids a relative friction between the plastic part made of for example PVCTE, and the metal part, reducing wear of links. In addition, the friction loss between the plastic parts such as the junk rings made of PVCTE is small, and even if wear occurs, debris is not easily generated, the replacement cost is low, and the replacement is convenient.

Furthermore, although the connections between first sealing component and second sealing component and their corresponding first member and second member have been described by way of example of seals such as O-rings, U-rings and annular sealing gaskets, it will be appreciated by those skilled in the art that the present disclosure is not limited thereto. For example, the first sealing component may be further fixedly connection with the first member by means of a key, a screw, a pin, a threaded connection element or similar removable connection element in addition to the first sealing portion, so that the first sealing component and the first member may be rotated securely and synchronously without a relative movement. Similarly, the second sealing component may be further fixedly connected to the second member through a key, a screw, a pin, a threaded connection element or similar removable connection element in addition to the third sealing portion, so that the second sealing component and the second member may be rotated securely and synchronously without a relative movement.

When the sealing device according to the embodiment of the present disclosure is applied between the links of the robot, between the link and the base, and/or between the link and the end-effector, it is possible not only to effectively prevent external water and dust from entering the interior of the robot, but also to effectively prevent contaminants such as grease and dust inside the robot from entering the external environment, thereby realizing a dynamic seal at a high protection level.

By selecting a wear-resistant material such as PVCTE, which has a low friction coefficient, to form a pair of junk rings that are relatively rotated, the sealing device can also achieve low friction and low wear while ensuring the sealing performance, which is more favorable for motion control of the robot.

By virtue of the structural characteristics of the U-ring having the annular opening, it is possible to realize the positive pressure of the low sealing contact surface under a low deformation amount, which helps to reduce the friction when the links are relatively rotated, thereby facilitating the motion control of the robot. In the embodiments described above with reference to the accompanying drawings, the O-ring on one side of the first sealing component ensures a radial seal and/or an axial seal for the first member according to its mounting positions, while the lipped seal on the other side of the second sealing component ensures a radial seal for the second member, it also ensures an axial seal due to the pressure subjected in the axial direction. Thus, by combining the O-ring with the U-ring in the sealing device, the sealing device is particularly suitable for being applied between two links of the robot arm.

When the first member is sealed radially with the O-ring, and the second member is sealed axially and radially with the U-ring, it is possible as long as the pressure between the first sealing component and the second sealing component is sufficient to meet the axial pressure required for the U-ring. Such a sealing structure advantageously reduces friction between the first sealing component and the second sealing component and achieves a dynamic seal.

In view of the fact that the material, such as PVCTE, belongs to plastic, the sealing device is not easy to generate dust particles even after a long-term operation, and is more suitable for special applications with high cleanliness requirements.

Some embodiment according to the present disclosure has been described as above, it should be understood that each of the technical features of the embodiments may be combined arbitrarily. For the sake of brevity, not all possible combinations of the respective technical features of the above embodiments are described. However, the combinations of these technical features should be considered to be within the scope of the description provided that they do not contradict each other.

The above-described embodiments represent only a few embodiments of the present disclosure, and the description is specific and detailed, but is not therefore to be construed as limiting the scope of the present disclosure. It should be noted that several variations and modifications may be made by those of ordinary skill in the art without departing from the spirit and scope of the present disclosure. Accordingly, the scope of protection of the present disclosure should be governed by the appended claims.

What is claimed is:

1. A sealing device configured for use between a first member and a second member, comprising:
 a first sealing component configured to be sealingly connected to the first member; and
 a second sealing component configured to be sealingly connected to the second member,
 wherein the first sealing component and the second sealing component are configured to form at least one dynamic seal with each other in a circumferential direction of the first member and the second member;
 wherein the first sealing component comprises a first sealing portion and a second sealing portion;
 wherein the first sealing portion is disposed between the first member and the second sealing portion and configured to seal the first member and the second sealing portion in a radial direction of the first member and the second member;
 wherein the second sealing component comprises a third sealing portion and a fourth sealing portion;
 wherein the third sealing portion is disposed between the second member and the fourth sealing portion and is configured to seal the second member and the fourth sealing portion in the radial direction and an axial direction of the first member and the second member,
 wherein the fourth sealing portion is configured to form the at least one dynamic seal with the second sealing portion in the circumferential direction of the first member and the second member; and
 wherein one of the second sealing portion and the fourth sealing portion defines a concave portion and the other of the second sealing portion and the fourth sealing portion is provided with a convex portion, wherein the convex portion is inserted into the concave portion and is in contact with the concave portion to form the at least one dynamic seal in the circumferential direction of the first member and the second member.

2. The sealing device according to claim 1,
 wherein the first sealing component is fixedly and sealingly connected to the first member; and/or
 wherein the second sealing component is fixedly and sealingly connected to the second member.

3. The sealing device according to claim 1, wherein the second sealing portion is made of plastic, and/or wherein the rigidity of the material of the second sealing portion is greater than that of the first sealing portion.

4. The sealing device according to claim 1, wherein the fourth sealing portion is made of plastic, and/or wherein the rigidity of the fourth sealing portion is greater than that of the third sealing portion.

5. The sealing device according to claim 1, wherein contact between the concave portion and the convex portion is substantially linear contact.

6. The sealing device according to claim 1, wherein:

a side surface of the concave portion or a portion of the side surface is a flat surface, and the convex portion has a smooth rounded surface in contact with the flat surface; or a side surface of the concave portion or a portion of the side surface is a smooth rounded surface, and the convex portion has a flat surface in contact with the smooth rounded surface; or a side surface of the concave portion or a portion of the side surface is a smooth rounded surface, and the convex portion has a smooth rounded surface in contact with the smooth rounded surface.

7. The sealing device according to claim 1, wherein the first sealing portion comprises an O-ring, an annular sealing gasket, or a U-ring mounted between the second sealing portion and the first member, and the second sealing portion comprises a junk ring, wherein the first sealing portion is made of rubber.

8. The sealing device according to claim 7, wherein the second sealing portion and/or the first member defines an annular groove, and the first sealing portion is disposed in the annular groove to seal the first member;

wherein the first member is provided with a first shoulder, and the second sealing portion is mounted against the first shoulder.

9. The sealing device according to claim 3, wherein the third sealing portion comprises a U-ring mounted between the fourth sealing portion and the second member, and the fourth sealing portion comprises a junk ring, wherein the third sealing portion is made of rubber.

10. The sealing device according to claim 9, wherein the fourth sealing portion and/or the second member defines an annular groove, the third sealing portion is disposed in the annular groove to seal the second member, the second member is provided with a second shoulder, and the third sealing portion is mounted against the second shoulder.

11. The sealing device according to claim 3, wherein the first sealing portion comprises an O-ring and is disposed between the first member and the second sealing portion;

wherein the third sealing portion comprises a U-ring, and the fourth sealing portion is disposed between the third sealing portion and the second sealing portion.

12. The sealing device according to claim 1, wherein the first member and the second member are made of metal; and/or wherein a portion of the first sealing component contacts a portion of the second sealing component and are made of plastic.

13. The sealing device according to claim 12, wherein the plastic comprises at least one of PVCTE, polyvinyl chloride, polypropylene, polyethylene, polybutene, acrylonitrile butadiene styrene, or polytetrafluoroethylene.

14. An apparatus comprising a first member and a second member that are made of metal and a sealing device according to claim 1 disposed between the first member and the second member.

15. A robot including a robot arm, the robot arm comprising at least a first member and a second member that are made of metal and a sealing device according to claim 1 disposed between the first member and the second member, wherein the first member is a first robot arm link, the second member is a second robot arm link, a base or an end-effector, wherein the second member is rotatably connected to the first member.

16. The robot according to claim 15, wherein the first sealing component comprises a first sealing portion and a second sealing portion, wherein the first sealing portion is disposed between the first member and the second sealing portion and configured to seal the first member and the second sealing portion in a radial direction of the first member and the second member, wherein the second sealing portion is made of plastic and is fixedly connected to the first member.

17. The robot according to claim 16, wherein the second sealing component has a third sealing portion and a fourth sealing portion, wherein the third sealing portion is disposed between the second member and the fourth sealing portion and configured to seal the second member and the fourth sealing portion in the radial direction and an axial direction of the first member and the second member, wherein the fourth sealing portion is made of plastic and is configured to form the at least one dynamic seal with the second sealing portion in the circumferential direction of the first member and the second member.

18. The robot according to claim 16, wherein the fourth sealing portion is fixedly connected to the second member.

* * * * *